US012152320B2

(12) United States Patent
Hainsworth et al.

(10) Patent No.: US 12,152,320 B2
(45) Date of Patent: Nov. 26, 2024

(54) FIRE RESISTANT TEXTILE MATERIAL

(71) Applicant: AW Hainsworth and Sons Limited, Leeds (GB)

(72) Inventors: Thomas Hainsworth, Leeds (GB); Derek Walker, Halifax (GB); Martin Haworth, Bury (GB)

(73) Assignee: AW Hainsworth and Sons Limited, Leeds (GB)

( * ) Notice: Subject to any disclaimer, the term of this patent is extended or adjusted under 35 U.S.C. 154(b) by 354 days.

(21) Appl. No.: 17/626,433

(22) PCT Filed: Jul. 13, 2020

(86) PCT No.: PCT/GB2020/051688

§ 371 (c)(1),
(2) Date: Jan. 11, 2022

(87) PCT Pub. No.: WO2021/009502

PCT Pub. Date: Jan. 21, 2021

(65) Prior Publication Data

US 2022/0290342 A1 Sep. 15, 2022

(30) Foreign Application Priority Data

Jul. 12, 2019 (GB) .................................... 19186153

(51) Int. Cl.
*D03D 15/513* (2021.01)
*A41D 31/08* (2019.01)
(Continued)

(52) U.S. Cl.
CPC ........... *D03D 15/513* (2021.01); *A41D 31/08* (2019.02); *A62B 17/003* (2013.01);
(Continued)

(58) Field of Classification Search
CPC .... D03D 15/513; D03D 15/283; D03D 15/33; D03D 15/225; D03D 15/275;
(Continued)

(56) References Cited

U.S. PATENT DOCUMENTS 6,699,802 B1 3/2004 Hainsworth et al.
6,955,193 B2 10/2005 Hainsworth et al.
(Continued)

FOREIGN PATENT DOCUMENTS

DE 10 2018 203761 2/2019
FR 3 030 583 6/2016
(Continued)

OTHER PUBLICATIONS

U.S. Office Action dated Oct. 6, 2021 from U.S. Appl. No. 16/509,943.
(Continued)

*Primary Examiner* — Jeremy R Pierce
(74) *Attorney, Agent, or Firm* — Beyer Law Group LLP

(57) ABSTRACT

A fire resistant textile material comprising a fire resistant textile material comprising a woven face fabric composed of fibres selected from: meta-aramid, para-aramid, polyamide-imide and mixtures thereof; wherein the number of warp face threads, per unit width (cm) is greater than the number of weft threads, per unit length (cm).

21 Claims, 4 Drawing Sheets

(51) Int. Cl.

| | |
|---|---|
| ***A62B 17/00*** | (2006.01) |
| ***D03D 1/00*** | (2006.01) |
| ***D03D 13/00*** | (2006.01) |
| ***D03D 15/225*** | (2021.01) |
| ***D03D 15/275*** | (2021.01) |
| ***D03D 15/283*** | (2021.01) |
| ***D03D 15/33*** | (2021.01) |

(52) U.S. Cl.
CPC ......... *D03D 1/0041* (2013.01); *D03D 13/008* (2013.01); *D03D 15/225* (2021.01); *D03D 15/275* (2021.01); *D03D 15/283* (2021.01); *D03D 15/33* (2021.01)

(58) Field of Classification Search
CPC .... D03D 1/0041; D03D 13/008; A41D 31/08; A62B 17/003; D10B 2331/021
See application file for complete search history.

(56) References Cited

U.S. PATENT DOCUMENTS

| | | | | |
|---|---|---|---|---|
| 2002/0098760 A1 | | 7/2002 | Butterfield et al. | |
| 2013/0008554 A1 | * | 1/2013 | Fisher | D03D 15/513<br>428/221 |
| 2013/0212790 A1 | * | 8/2013 | Waxman | D04B 1/14<br>428/221 |
| 2021/0010172 A1 | | 1/2021 | Walker et al. | |

FOREIGN PATENT DOCUMENTS

| | | | | |
|---|---|---|---|---|
| GB | 2 516 134 | | 1/2015 | |
| WO | WO-2015004432 A1 | * | 1/2015 | D03D 1/0035 |
| WO | WO 2016/102873 | | 6/2016 | |

OTHER PUBLICATIONS

International Search Report dated Oct. 28, 2020 from International Application No. PCT/GB2020/051688.
Written Opinion dated Oct. 28, 2020 from International Application No. PCT/GB2020/051688.
"Stretch Broken Spinning System" by Technical Application Yarns, Sep. 2, 2018, http://web.archive.org/web/20180902012019/https://tay.it/stretch-broken-spinning-system/, obtained from Wayback Machine (downloaded on Sep. 16, 2021).

* cited by examiner

FIGURE 1A
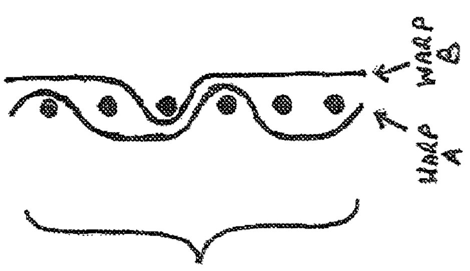
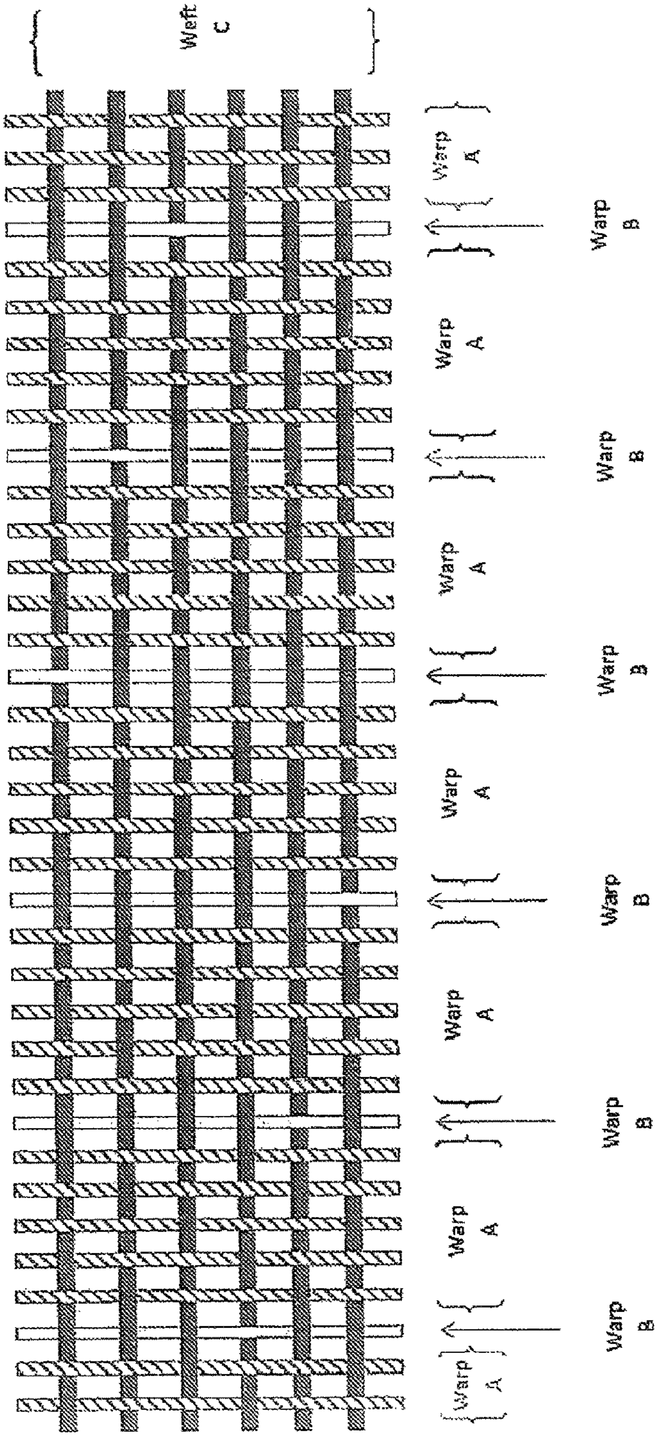
FIGURE 1

FIRE RESISTANT TEXTILE MATERIAL

This invention relates to fire resistant textile materials and garments made from these materials. The invention relates particularly but not exclusively to articles of clothing for use by fire fighters and for textiles for manufacture of such clothing.

European legislation requires employers to provide garments which protect their employees against hazards to which they may be exposed. Clothing for protection against heat and flame must pass minimum performance requirements for flame, radiant heat, heat resistance, tensile and tear strength, abrasion resistance and penetration by water and liquid chemicals. The assembled garments must achieve levels of resistance to heat transfer by both flame and radiant heat.

One of the most effective ways to reduce second and third degree burns is to make sure that the barrier of protective clothing between the heat source and the skin remains intact during exposure. This property is referred to as the break open resistance or non-break open protection of the fabric.

Outer textile materials for firefighting clothing have previously been manufactured from 100% meta-aramid or polyamideimide, blends of polyparaphenylene isophthalamide (meta-aramid e.g. Nomex) and polyphenylene terephthalamide copolymer (para-aramid fibres e.g. Kevlar) or by use of core spun yarns or staple mixtures with polyparaphenylene terephthalamide copolymer or fibres comprising para-aramid cores with meta-aramid or polyamideimide covers. The combination of these fibres in the fabric enhances the non-break open protection of the product. However meta-aramid and para-aramid fibres shrink, consolidate and thicken when exposed to a high temperature heat source. The presence of meta-aramid or para-aramid in either the fibre blend or as a core can be used to prevent fibre shrinkage and consequent breaking open of the garment. However the inclusion of para-aramid fibre in the blend has been found to be insufficient in tightly woven fabrics to prevent breaking open. Consequently there is a need for improved textile materials for manufacture of fire fighters' garments and the like.

Fire fighting garments have been made from a plurality of textile layers, including an outer layer of woven meta-aramid fibre, for example as manufactured under the trade mark Nomex. Break open protection may be afforded by blending with para-aramid fibres, for example as manufactured under the trade mark Kevlar and as disclosed in U.S. Pat. Nos. 3,063,966 and 3,506,990. However charring of such blends may lead to cracking and embrittlement with consequent deterioration of physical properties.

EP 1173635 discloses a fire resistant textile material comprising a woven faced or warp knitted fabric composed of meta-aramid, para-aramid or mixtures thereof, the fabric including a woven mesh back of low-thermal shrinkage fibres which form an interwoven backing scrim on the face of the fabric, the ratio of face to back yarns being in the range of 6:1 to 12:1.

FR3030583 discloses a fire resistant double cloth material obtained by bonding two textile layers of distinct compositions.

According to a first aspect of the present invention a fire resistant textile material comprises a single, woven warp backed fabric composed of fibres selected from: meta-aramid, para-aramid, polyamideimide, polybenzimidazole, polybenzoxazole and mixtures thereof; wherein the fabric comprises face warp threads and back warp threads, wherein the number of face warp threads per unit width (cm) is greater than the number of weft threads per unit length (cm); and wherein each back warp thread either interlaces or passes under successive weft threads so that the ratio of the total number of interlaced weft threads to passed under weft threads is in a range from 1:2 to 1:20.

A single cloth is a fabric in which a single set of warp threads are employed.

In contrast, a double cloth is a compound fabric in which two single cloths are held together, for example by centre-stitching, self-stitching or interchanging of warp or weft threads. A double cloth has two or more sets of warp threads.

The fabric of the present invention confers several advantages over double cloth fabrics.

The fabric of the present invention may comprise a combination of densely packed face warp threads with interlaced back warp threads. This arrangement achieves similar technical performance to a double cloth and may have a significantly reduced weight in comparison to a double cloth. The fabric may be highly flexible in one direction but less flexible in another direction. This confers advantages in relation to garment manufacture and properties.

In the densely packed face warp direction, a yarn with relatively high extension may be used. In the less densely packed back warp a lower extension yarn may be used.

The back warp threads may be loosely interlaced with the weft threads, so that the back warp threads lie on the back surface of the cloth.

The fabric may therefore consist of a single cloth with extra warp threads on the back to provide improved physical properties.

In an embodiment, the ratio is selected from: 1:2; 1:5; 1:8; 1:11; 1:14; 1:17; 1:20.

In an embodiment, the back warp threads form a repeating pattern in which the total number of interlaced threads to passed under weft threads is an integral integer divisible by 3.

In an embodiment, the back warp threads form a repeating pattern consisting of successively interlacing first weft threads followed by extending beneath an array of weft threads.

In an embodiment the back warp thread extends beneath an array comprising a number of adjacent weft threads, wherein the number is an integer between 2 and 20, preferably between 5 and 14.

The face warp threads may incorporate meta-aramid fibres or blends of fibres including meta-aramid fibres which provide good abrasion resistance.

When meta aramid face warp threads are used the proportion of meta-aramid fibres may be equal or greater than 90%, for example greater than 93%, for example greater than 95%. The back warp fibres may be selected from para-aramid fibres and blends including para-aramid, particularly including at least 25% para-aramid. Exemplary threads provide good break open resistance.

When polybenzimidazole (PBI), polybenzoxazole (PBO) or a high para-aramid content face warp is used advantageous abrasion resistance of the face warp threads may be provided by use of a blend including a proportion, for example up to 10% w/w of polyamide (Nylon (Registered Trade Mark)) or by use of a blend of polyamide with up to 5% w/w antistatic fibres, for example fibres comprising a carbon core and a polyamide sheath.

The face warp may already comprise stretch broken para-aramid fibres; or a blend of stretch broken para-aramid and polybenzimidazole (PBI), polybenzoxazole (PBO) polyetheretherketone, flame retardant viscose or carbon fibres. Back warp threads comprising para-aramid, PBI or PBO provide high thermal stability and may have a count which is finer, that is the threads are lighter in weight than 60/2 Nm. Relatively fine yarns having a count greater than 60/2 Nm may be employed.

A back warp yarn having high break open resistance as disclosed above may be stitched onto the back of the woven face fabric. Where blended fibres are used these may be spun into a yarn.

The back warp yarn may have a count greater than (that is finer or lighter in weight) than 60/2 Nm. Therefore the face warp yarn may be coarse, (that is heavier) than the back warp yarn and may have a count of, for example, 40/2 Nm.

The proportion and count of face side yarns to reverse side yarns may be determined by-the required weight of the final fabric, the interlacing of the face weave and the degree of effectiveness required from the properties of the reverse side yarn.

The weft yarn may conveniently comprise fibres which are the same as the back warp fibres.

Fabrics in accordance with the invention may confer the advantage of increased thermal protection together with greater flexibility in comparison to traditional single layer fabrics of comparable weights.

The back warp and weft threads interchange to form a loosely interwoven structure which retains integrity of a garment in contact with a fire. In the event of contact with a fire, the surface threads may char, but disintegration of the fabric may be prevented by the integrity of the interwoven structure, avoiding exposure of a wearer to the fire.

Fabrics of this invention may serve to increase the thermal protection afforded by the garment and may increase the number of seconds needed to raise the temperature on the inner side to a level which would create pain or a second degree burn on human skin or on the type of sensor used in Thermal Protection Procedure (TPP) testing.

The presence of low thermal shrinkage fibres on the surface of a garment, for example Kevlar may result in formation of fine fibrils, due to abrasion in use. Coloured fabrics, for example dark blue fabrics as used for fire fighters' tunics may therefore develop light specks on the surface of the fabric. This gives an uneven appearance on a dark coloured garment. This effect is referred to as fabric frosting.

Fire resistant fabrics in accordance with this invention confer a further advantage in comparison to fabrics constructed in a traditional manner, by packing the face of the fabric with threads that exhibit reduced liability to abrasion. Also as described above, by facilitating construction of a yarn composed of blends of fibres selected to improve abrasion resistance of the fabric.

The low shrinkage fibres are preferably located behind the face fabric. This minimises exposure of the strengthening fibres to the heat source.

Fabrics in accordance with this invention may be produced by interweaving yarns which have been spun, plied or core spun from staple fibres and/or multifilament fibres which may comprise 100% of the following: meta-aramid, para-aramid, polyamideimide, polybenzimidazole (PBI), polybenzoxazole (PBO) or intimate blends of any combination of these fibres.

In a preferred method the yarns used for the warps of both the face and reverse sides of the fabric may be assembled in the specified proportions and order of working by the sectional warping process onto one or two warped beams jointly having the total number of ends required to weave the final fabric.

The weft yarns may be inserted across and interlaced with the warp yarns in the specified proportions, the order of working and density being selected to produce the required face weave.

Differential tension may be applied to the face and reverse side yarns during the weaving process and during the insertion of the weft. This is important to compensate for the varying degrees of elongation of the different types of fibres used in those yarns and the difference in the number of weave interlacing between the warp and weft yarns of the fabric. These factors are important to determine the properties of the fabric of this invention.

A preferred weaving machine which may be used to produce a fabric of this invention will supply the face and back warp yarns from individual warp beams at different feed rates to compensate for the varying degrees of elongation and the varying inter-lacings of the face fabric yarns and reverse side yarns.

Fabrics of this invention may have a lighter weight whilst providing a high degree of thermal protection, flexibility and durability allowing comfortable use in a wide range of protective garments.

The flexibility of the fabric structure is enhanced by packing the face with yarns arranged in one direction i.e. the warp direction and loosely interlacing the yarns in the weft direction with the back warp yarns where the packing/density/set of the weave is lower.

This invention allows manufacture of fabrics which have a lighter weight, for example 180 $gm^{-2}$, while providing a high degree of thermal protection, flexibility and durability including high abrasion resistance and stability to multiple washing cycles, while giving comparable or superior performance than heavier weight fabrics currently in the market place. The lighter weight fabrics of this invention may also reduce heat stress experienced by a wearer and may contribute to reduction in overall weight of the garment. In contrast, previously known double cloth fabrics, such as disclosed in FR3030583, have a weight of 250 $gm^{-2}$ or greater.

Fabrics in accordance with this invention may have a gaberdine face effect. Gaberdine is a fabric having a surplus of ends over picks. In exemplary gaberdine fabrics the excess of ends to picks may be in the range of 1.25:1 to 2:1 although the range may vary dependent on the required fabric weight and yarn count used.

Exemplary fabrics of this invention may have a weave structure selected from: 2×1 twill or 2×1 twill with rip stop.

A 2×1 twill is a weave comprising units in which each warp thread passes over two weft threads then under one weft thread, successive units being offset by one weft interlaced thread.

Further advantageous fabrics of this invention include 2×2 twill, 3×1 twill, 3×1 satin weave, 3×1 Broken Crow, Devon, Venetian, Doeskin and the like; all of the aforementioned fabrics being either with or without rip stop.

The ratio of face warp yarns to back warp yarns may be in the range from about 1:1 to 20:1, for example about 1:1 to about 16:1, for example about 1:1 to about 15:1.

The proportion of face ends to back ends may be in the ratio of 5:1.

Alternative ratios may be selected from 1F (face) to 1B (back), 2F to 1B, 4F to 1B, 7F to 1B, 8F to 1B, 1° F. to 1B, 11F to 1B, 13F to 1B, 14F to 1B, 16F to 1B, 17F to 1B, 19F to 1B, or 20F to 1B.

An increased ratio of ends to picks may give a steep twill appearance to the finished cloth. This may improve runoff of water or other liquids in use.

In contrast to a conventional warp back construction, each back end may be interlaced with a weft pick. This has the advantage that if the face warp is stripped from the fabric in use, the back warp and weft may continue to form a loosely woven fabric.

Preferably the face:back ratios which are divisible by the repeat number of face ends in the weave are avoided.

In an exemplary embodiment in a 2×1 twill, the repeat number of face ends is 3. In this case proportions of 3F (face) to 1B (back), 6F to 1B, 9F to 1B, 12F to 1B, 15F to 1B and 18F to 1B are not used.

Use of a warp back stitched to the weft increases the weight of the fabric while maintaining the fineness of the face. The back warp yarn and weft may be selected from para-aramid, PBI, PBO or blends thereof, the back warp being interlaced with every thread of the weft. This has the advantage that there are no loose yarns which may burn away when exposed to a high level of heat.

The yarns employed in a fabric of this invention may be selected to have weft tensile and tear strengths sufficient to meet the requirements for use in a specific fabric with a relatively reduced number of picks per unit measure.

For example, the weft yarn may be selected from: (1) a relatively high strength, Nm 100/2 (Numerometric, including single or multiple folding of yarns) 100% para-aramid yarn or (2) a combination of Nm 100/2 and Nm 50/2 100% para-aramid yarns with Nm 20/2 or (3) Nm 100/2 with Nm 40/2 meta-aramid yarns.

According to a second aspect of this invention there is provided a firefighter's garment comprising a textile material in accordance with the first aspect of this invention. Garments in accordance with this invention are advantageous in comparison to previously known garments.

Previously known firefighters' garments comprise composites of three textile layers: an outer fabric, a moisture barrier and a quilted thermal lining. The present invention may reduce the need for use of such layers or may allow the weight of the layers to be reduced.

The warp back construction of the fabric allows manufacture of garments having a relatively fine face appearance with the additional fabric thickness due to the extra back warp threads.

The additional thickness may give improved thermal properties in comparison to an equivalent single fabric.

The invention is further described by means of an example, but not in any limitative sense, with reference to the accompanying drawings of which:

FIG. 1 illustrates a first fabric in accordance with this invention;

FIG. 1 shows a fabric in which face warp threads A interlace with weft threads C to form a 2×1 twill gaberdine effect face to the cloth. Back warp threads B interlace with weft threads C in such a way that the point of interlacing is hidden by the face warp threads A. The back warp threads B lie on the back of the fabric, unseen on the face but adding bulk and weight to the fabric.

FIG. 1A is a cross sectional diagram of the fabric showing the interlacing of 1 face warp thread A and 1 back warp thread B with the weft threads C. The diagram illustrates that the repeat of the fabric weave utilises 6 weft threads C. The face warp thread A interlaces 4 times with the weft threads C being an average of 1.5 weft threads C per interlacing. The back warp thread B interlaces 2 times with the weft threads C being an average of 3.0 weft threads C per interlacing. The different average of the interlacing i.e. 1.5 and 3.0 requires application of differential tensions to the face warp threads A and the back warp threads B in the weaving machine. This will ensure a trouble free weaving process which will achieve a final fabric which meets the specified technical properties of the fabric.

Figure 2A:
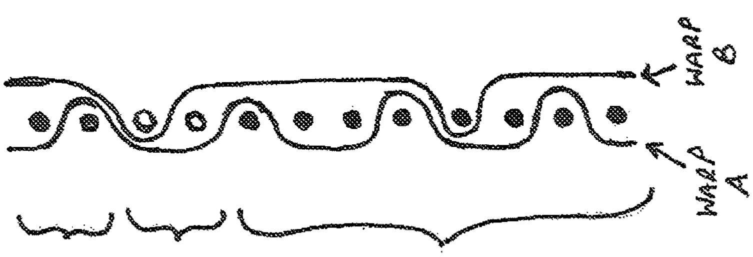
FIG. 2 illustrates the second fabric in accordance with this invention.
Figure 2:
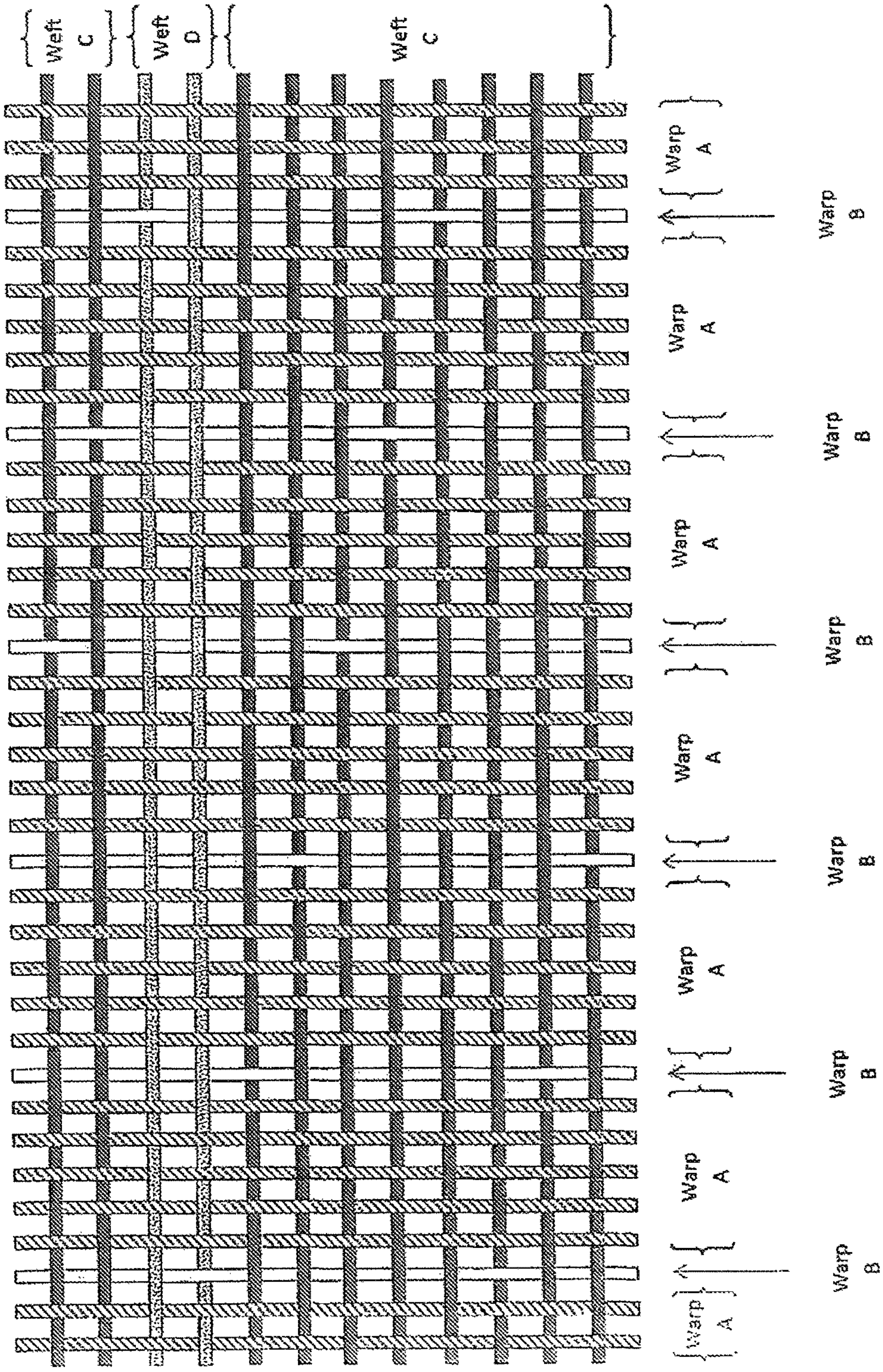

FIG. 2 shows a fabric in which face warp threads A interlace with weft threads C and D to form a 2×1 rip stop twill gaberdine effect face to the cloth. Back warp threads B interlace with weft threads C and D in such a way that the point of interlacing is hidden by the face warp threads A. The back warp threads B lie on the back of the fabric, unseen on the face but adding bulk and weight.

FIG. 2A is a cross sectional diagram of the fabric showing the interlacing of 1 face warp thread A and 1 back warp thread B with the weft threads C and D. The diagram illustrates that the repeat of the fabric weave utilises 12 weft threads C and D. The face warp thread A interlaces 8 times with the weft threads C and D being an average of 1.5 weft threads C and D per interlacing. The back warp thread B interlaces 4 times with the weft threads C and D being an average of 3.0 weft threads C and D per interlacing. The different average of the interlacing i.e. 1.5 and 3.0 requires application of differential tensions to the face warp threads A and the back warp threads B in the weaving machine. This will ensure a trouble free weaving process to achieve a final fabric which meets the specified technical properties of the fabric.

Figure 3A:
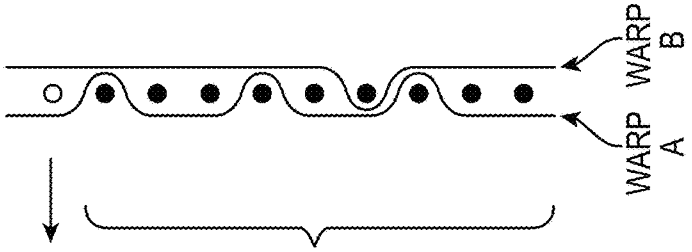
FIG. 3 illustrates the third fabric in accordance with this invention.
Figure 3:
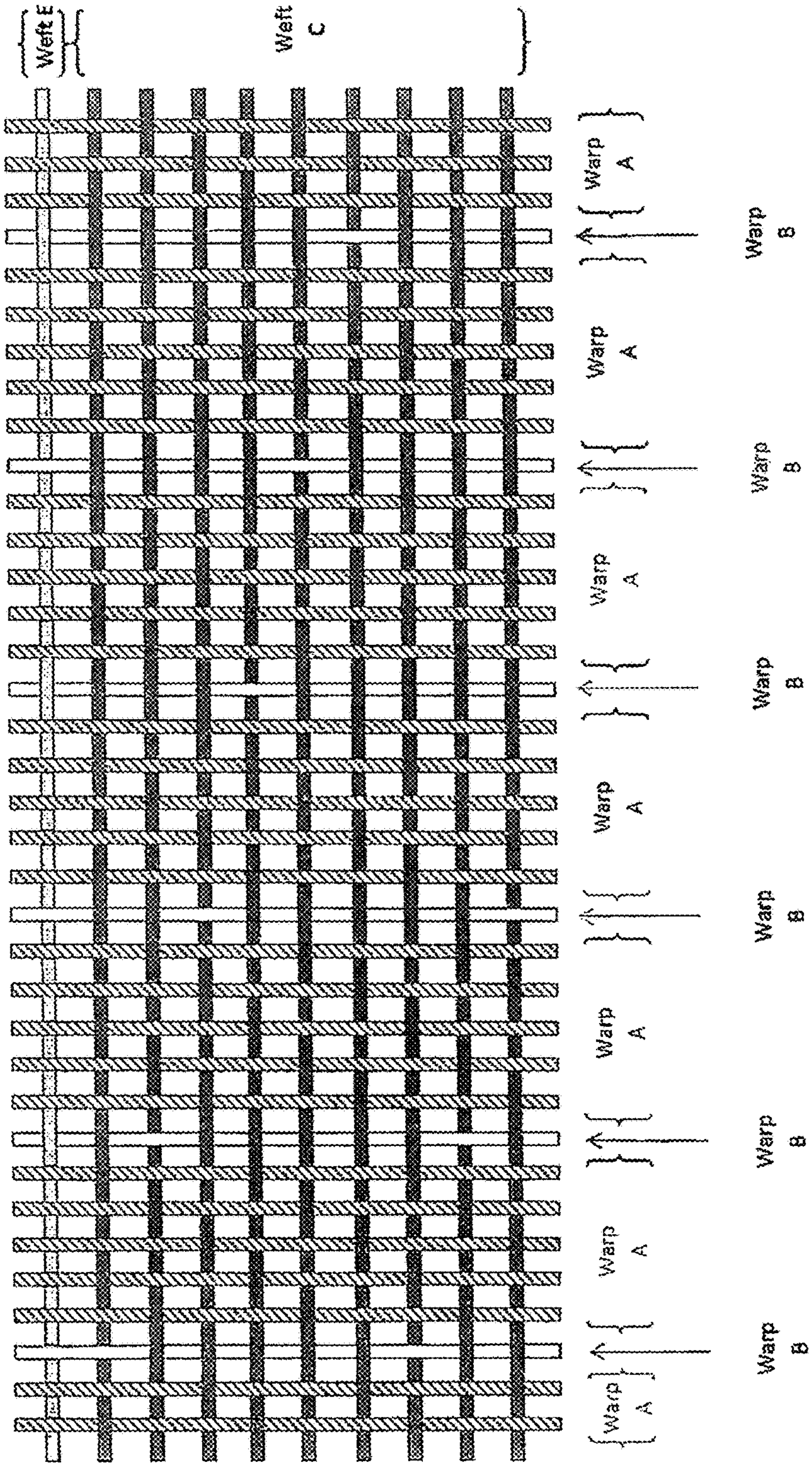

FIG. 3 shows a fabric in which face warp threads A interlace with face weft threads C and back weft threads E. The interlacing with weft threads C form a 2×1 twill gaberdine effect face to the cloth. Back warp threads B interlace with weft threads C and E in such a way that the point of interlacing is hidden by the face warp threads A. The back warp threads B and the back weft threads E lie on the back of the fabric, unseen on the face but adding bulk and weight to the fabric.

FIG. 3A is a cross sectional diagram of the fabric showing the interlacing of 1 face warp thread A and 1 back warp thread B with the face weft threads C and the back weft threads E. The diagram illustrates that the repeat of the face fabric weave utilises 6 weft threads C. The face warp thread A interlaces 4 times with the face weft threads C being an average of 1.5 weft threads C per interlacing. The back warp thread B interlaces 2 times with the face weft threads C being an average of 3.0 weft threads C per interlacing. The different average of the interlacing i.e. 1.5 and 3.0 requires application of differential tensions to the face warp threads A and the back warp threads B in the weaving machine in order to ensure a trouble free weaving process which will achieve the final fabric which meets the specified technical properties of the fabric.

Figure 4A:
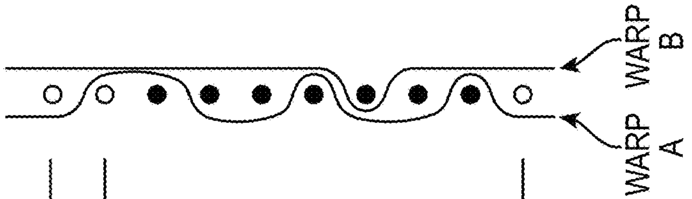
FIG. 4 illustrates a fourth fabric in accordance with this invention.
Figure 4:
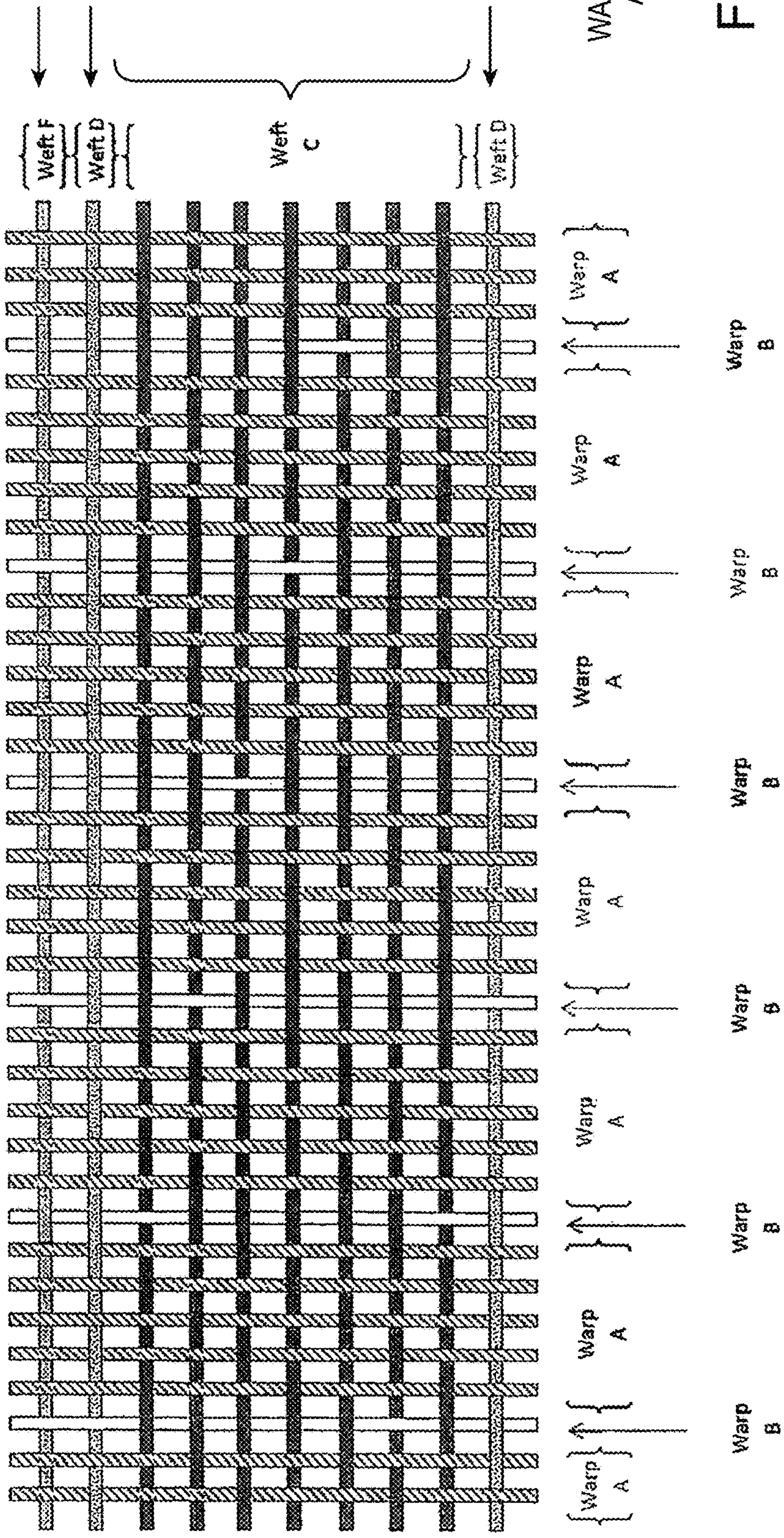

FIG. 4 is a diagram showing a fabric in accordance with this invention in which the face warp threads A interlace with face threads C and D and back weft threads F. The interlacing with weft threads C and D form a 2×1 rip stop twill gaberdine effect face to the cloth. Back warp threads B interlace with weft threads C and D in such a way that the point of interlacing is hidden by the face warp threads A. The back warp threads B and the back weft threads F lie on the back of the fabric, unseen on the face but adding bulk and weight.

FIG. 4A is a cross sectional diagram of the fabric showing the interlacing of 1 face warp thread A and 1 back warp thread B with the face weft threads C and D and the back weft threads F. The diagram illustrates that the repeat of the face fabric weave utilises 6 weft threads C and D. The face warp thread A interlaces 4 times with the face weft threads C and D being an average of 1.5 weft threads C and D per interlacing. The back warp thread B interlaces 2 times with the face weft threads C and D being an average of 3.0 weft threads C and D per interlacing. The different average of the interlacing i.e. 1.5 and 3.0 requires application of differential tensions to the face warp threads A and the back warp threads B in the weaving machine in order to ensure a trouble free weaving process which will achieve the final fabric which meets the specified technical properties of the fabric.

The invention claimed is:

1. A fire resistant textile material comprises a single woven layer warp backed fabric comprising fibres selected from: meta-aramid, para-aramid, polyamideimide, polybenzimidazole, polybenzoxazole and mixtures thereof;

wherein the fabric comprises face warp threads and back warp threads, wherein the number of face warp threads per unit width (cm) is greater than the number of weft threads per unit length (cm); and wherein each back warp thread either interlaces or passes under successive weft threads so that the ratio of the total number of interlaced weft threads to passed under weft threads is in a range from 1:2 to 1:20.

2. A fire resistant textile material as claimed in claim 1, wherein the ratio is selected from: 1:2; 1:5; 1:8; 1:11; 1:14; 1:17; 1:20.

3. A fire resistant textile material as claimed in claim 1, wherein the back warp threads form a repeating pattern in which the total number of interlaced threads to passed under weft threads is an integral integer divisible by 3.

4. A fire resistant textile material as claimed in claim 1, wherein the back warp threads form a repeating pattern consisting of successively interlacing first weft threads followed by extending beneath an array of weft threads.

5. A fire resistant textile material as claimed in claim 1, wherein the back warp thread extends beneath an array comprising a number of adjacent weft threads, wherein the number is an integer between 2 and 20.

6. A fire resistant textile material as claimed in claim 1, wherein the face warp threads have an elongation at break greater than the elongation at break of the back warp or weft threads.

7. A fire resistant textile material as claimed in claim 1, wherein the face warp threads are selected from meta-aramid fibres including more than 50% meta-aramid fibres.

8. A fire resistant textile material as claimed in claim 1, wherein the face warp threads comprise polybenzimidazole fibres.

9. A fire resistant textile material as claimed in claim 8 wherein the warp face threads comprise a blend of polybenzimadazole fibres with up to 10% w/w polyamide fibres or 10% w/w of a blend of polyamide with up to 5% w/w antistatic fibres.

10. A fire resistant textile material as claimed in claim 1 wherein the face warp threads comprise a proportion of meta-aramid fibres equal or greater than 90%.

11. A fire resistant textile material as claimed in claim 1 wherein the back warp threads are selected from para-aramid fibre blends including at least 25% para-aramid fibres.

12. A fire resistant textile material as claimed in claim 1 wherein the face warp threads comprise: stretch broken para-aramid fibres or a blend of stretch broken para-aramid and polybenzimidazole (PBI), polyetherketone, flame retardant viscose or carbon fibres.

13. A fire resistant textile material as claimed in claim 1 in the back warp threads comprising para-aramid or PBI have a count finer than 60/2 Nm.

14. A fire resistant textile material as claimed in claim 1, wherein the face of the fabric contains abrasion resistant fibres.

15. A fire resistant textile material as claimed in claim 1, wherein the back warp threads have a lower shrinkage than the face warp threads.

16. A fire resistant textile material as claimed in claim 1, wherein the fabric is a 2×1 twill or 2×1 twill with rip stop.

17. A fire resistant textile material as claimed in claim 1, wherein each back warp thread is interlaced with a weft thread.

18. A firefighter's garment comprising a textile material in accordance with claim 1.

19. A fire resistant textile material as claimed in claim 5, wherein the number is an integer between 5 and 14.

20. A fire resistant textile material as claimed in claim 1 wherein the face warp threads comprise a proportion of meta-aramid fibres equal or greater than 93%.

21. A fire resistant textile material as claimed in claim 1 wherein the face warp threads comprise a proportion of meta-aramid fibres equal or greater than 95%.

* * * * *